United States Patent [19]

Usui et al.

[11] Patent Number: 4,681,749
[45] Date of Patent: Jul. 21, 1987

[54] PROCESS FOR PREPARATION OF SYNTHETIC CRYSTALLINE ZINC SILICATE MINERAL HAVING A SAUCONITE, WILLEMITE OR HEMIMORPHITE STRUCTURE

[75] Inventors: Koichi Usui, Hoya; Teiji Sato; Masanori Tanaka, both of Shibata, all of Japan

[73] Assignee: Mizusawa Industrial Chemicals, Ltd., Tokyo, Japan

[21] Appl. No.: 747,235

[22] Filed: Jun. 21, 1985

[30] Foreign Application Priority Data

Jun. 22, 1984 [JP] Japan ............................... 59-127570

[51] Int. Cl.$^4$ ............................................. C01B 33/20
[52] U.S. Cl. ..................................... 423/326; 423/99; 106/292
[58] Field of Search .......................... 423/326, 327, 99; 106/292

[56] References Cited

U.S. PATENT DOCUMENTS

| | | | |
|---|---|---|---|
| 3,264,130 | 8/1966 | Mays | 423/326 X |
| 3,328,125 | 6/1967 | Mays et al. | 423/328 |
| 3,437,441 | 4/1969 | Mays et al. | 423/118 |

Primary Examiner—John Doll
Assistant Examiner—Jackson Leeds
Attorney, Agent, or Firm—Sherman and Shalloway

[57] ABSTRACT

A crystalline zinc silicate mineral of the sauconite, hemimorphite or willemite type is prepared by subjecting an acid-treated product of a clay mineral and an oxide or hydroxide of zinc or a compound capable of forming this oxide or hydroxide under reaction conditions to a hydrothermal treatment. This crystalline zinc silicate mineral has a fine and uniform particle size and is excellent in the pigmenting characteristics.

13 Claims, 3 Drawing Figures

PROCESS FOR PREPARATION OF SYNTHETIC CRYSTALLINE ZINC SILICATE MINERAL HAVING A SAUCONITE, WILLEMITE OR HEMIMORPHITE STRUCTURE

BACKGROUND OF THE INVENTION (1) Field of the Invention

The present invention relates to a process for the preparation of a synthetic crystalline zinc silicate mineral. More particularly, the present invention relates to a process for the preparation of a crystalline zinc silicate mineral having a crystal structure of the sauconite, hemimorphite or willemite type.

(2) Description of the Prior Art

A process for the synthesis of a zinc silicate mineral of the sauconite, hemimorphite or willemite type has already been known (Della M. Roy and F. A. Mumpton: Processing of 1955 Annual Meeting of the Mineralogical Society of America, pages 432 through 443). According to this known process, zinc nitrate is reacted with ethyl silicate to form a gel of zinc silicate and this gel of zinc silicate is subjected to a hydrothermal treatment under a high pressure of 500 to 40,000 psi at a temperature of 180° to 210° C. to obtain zinc silicate of the sauconite type, and if the hydrothermal treatment is carried out at a higher temperature, a zinc silicate mineral of the hemimorphite or willemite type is obtained.

However, this process is defective in that a very high pressure is necessary and it is difficult to prepare a zinc silicate mineral of the above-mentioned structure of an industrial scale.

SUMMARY OF THE INVENTION

We found that when active silicic acid is selected as the starting silicate component and is subjected to a hydrothermal treatment together with the starting zinc component, a synthetic crystalline zinc silicate mineral can be obtained even under a relatively low pressure condition and this synthetic crystalline zinc silicate mineral is excellent in the fineness and uniformity of the particle size and has valuable characteristics such as a good pigmenting property and a high oil absorbing property.

It is therefore a primary object of the present invention to provide a process in which a crystalline zinc silicate mineral, especially synthetic sauconite type, synthetic hemimorphite or synthetic willemite, is easily prepared on an industrial scale.

Another object of the present invention is to provide a process for the preparation of a synthetic crystalline zinc silicate mineral which is excellent in the fineness and uniformity of the particle size and the pigmenting property and is valuable as a filler or the like.

In accordance with the present invention, there is provided a process for the preparation of a synthetic crystalline zinc silicate mineral, which comprises subjecting an acid-treated product of a clay mineral and an oxide or hydroxide of zinc or a compound capable of forming said oxide or hydroxide under reaction conditions to a hydrothermal treatment.

DETAILED DESCRIPTION OF THE PREFERRED EMBODIMENTS

The present invention will now be described in detail.

Structure of Synthetic Crystalline Zinc Silicate Mineral

The synthetic crystalline zinc silicate mineral according to the present invention has a crystal structure of the sauconite type and/or the hemimorphite type and/or the willemite type according to the molar ratio between $SiO_2$ and $ZnO$ used as the starting materials and other synthesis conditions.

Zinc silicate of the sauconite type is zinc phyllosilicate of a three-layer structure having a chemical structure represented by the following formula:

$$Zn_3Si_4O_{10}(OH)_2 \quad (1)$$

This phyllosilicate has a basic skeleton of a three-layer structure comprising two layers of a tetrahedron of $SiO_4$ bonded through an intermediate layer of an octahedron of $ZnO_6$, and these basic skeletons are laminated in the direction of the axis C to form a laminated crystal structure.

Figure 1:
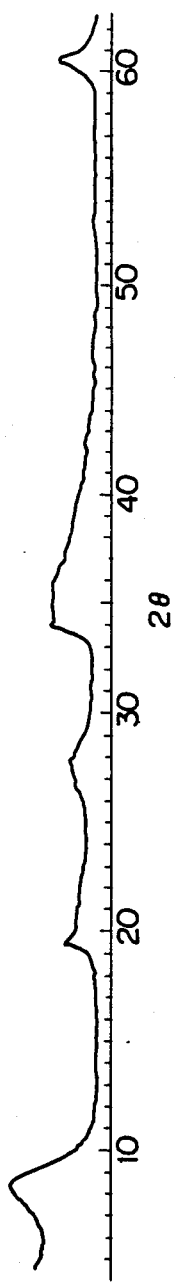
FIG. 1 shows an X-ray diffraction spectrum by Cu-Kα rays of synthetic zinc silicate of the sauconite type prepared in Example 1 of the present invention.

FIG. 1 of the accompanying drawings shows an X-ray diffraction spectrum of synthetic zinc silicate of the sauconite type according to the present invention. It will be understood that this synthetic zinc silicate of the sauconite type has an X-ray diffraction pattern shown in Table A given below.

TABLE A

| Spacing dx (Å) | Relative Intensity I/Io |
|---|---|
| 16–9 | 100 |
| 4.6–4.5 | 40–60 |
| 3.3–3.1 | 20–40 |
| 2.7–2.4 | 50–80 |
| 1.6–1.5 | 50–80 |

Zinc silicate of the hemimorphite type is zinc sorosilicate having a chemical structure represented by the following formula:

$$Zn_4Si_2O_7(OH)_2 \quad (2)$$

This sorosilicate is in the form of a columnar crystal.

Figure 2:
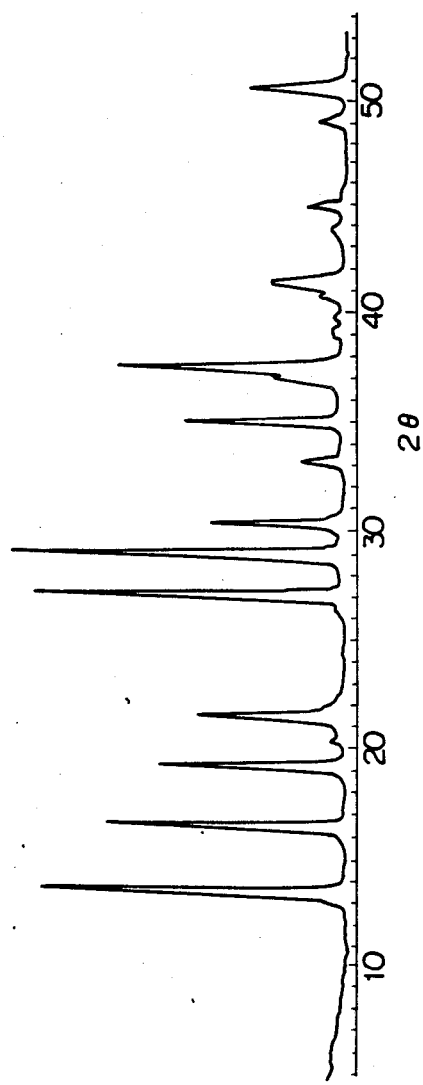
FIG. 2 shows an X-ray diffraction spectrum by Cu-Kα rays of synthetic zinc silicate of the hemimorphite type prepared in Example 3 of the present invention.

FIG. 2 shows an X-ray diffraction spectrum of synthetic hemimorphite according to the present invention. It will be understood that this synthetic hemimorphite has an X-ray diffraction pattern shown in Table B given below.

TABLE B

| Spacing dx (Å) | Relative Intensity I/Io |
|---|---|
| 6.59 | 94 |
| 5.38 | 73 |
| 4.62 | 57 |
| 4.15 | 45 |
| 3.30 | 94 |
| 3.09 | 100 |
| 2.95 | 40 |
| 2.70 | 14 |
| 2.56 | 49 |
| 2.43 | 22 |
| 2.40 | 68 |

TABLE B-continued

| Spacing dx (Å) | Relative Intensity I/Io |
|---|---|
| 2.31–2.29 | 3 |
| 2.25 | 3 |
| 2.21 | 7 |
| 2.19–2.18 | 22 |
| 2.07 | 5 |
| 2.02 | 11 |
| 1.98 | 2 |
| 1.86–1.85 | 8 |
| 1.80 | 30 |

Zinc silicate of the willemite type is zinc nesosilicate having a composition represented by the following formula:

$$Zn_2SiO_4 \qquad (3)$$

Figure 3:
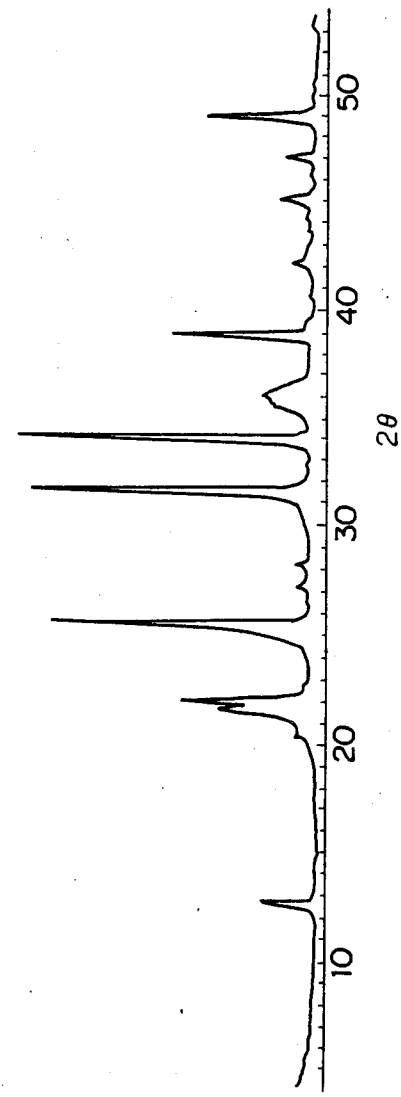
FIG. 3 shows an X-ray diffraction spectrum by Cu-Kα rays of synthetic zinc silicate of the willemite type prepared in Example 4 of the present invention.

FIG. 3 shows an X-ray diffraction spectrum of synthetic willemite according to the present invention, and this synthetic willemite has an X-ray diffraction pattern shown in Table C given below.

TABLE C

| Spacing dx (Å) | Relative Intensity I/Io |
|---|---|
| 6.98 | 17 |
| 4.35 | 9 |
| 4.10 | 40 |
| 4.03 | 46 |
| 3.49 | 89 |
| 3.26 | 7 |
| 3.15 | 7 |
| 2.83 | 96 |
| 2.72 | 3 |
| 2.63 | 100 |
| 2.53–2.43 | 18 |
| 2.32 | 47 |
| 2.28 | 5 |
| 2.21 | 3 |
| 2.14 | 8 |
| 2.07 | 3 |
| 2.05 | 3 |
| 2.01 | 12 |
| 1.97 | 3 |
| 1.93 | 11 |
| 1.86 | 38 |
| 1.83 | 3 |
| 1.81 | 3 |

The crystalline zinc silicate mineral according to the present invention is composed mainly of the above-mentioned sauconite type zinc silicate and/or hemimorphite type zinc silicate and/or willemite type zinc silicate. However, the crystalline zinc silicate mineral according to the present invention may have a part of the $SiO_2$ component and/or ZnO component substituted with an $Al_2O_3$ component, so far as the above-mentioned crystal structure is maintained, for example, in an amount not exceeding 10 mole % of $SiO_2$. Of course, this synthetic mineral may be composed solely of sauconite type zinc silicate, hemimorphite type zinc silicate or willemite type zinc silicate, or composed of at least two members selected from these three zinc silicates or of a mixture of the above-mentioned crystalline zinc silicate with amorphous zinc silicate or amorphous silicic acid.

Zinc silicate of the hemimorphite type is ordinarily stable at temperatures of up to 700° C., but at higher temperatures, dehydration reaction is caused and zinc silicate of the hemimorphite type is transformed into willemite.

Preparation Process

In the process of the present invention, active silicic acid or active aluminosilicic acid prepared by an acid treatment of a clay mineral is used as the starting silicic acid component. This active silicic acid or aluminosilicic acid shows, in the synthesis of a zinc silicate mineral, characteristics not possessed by other starting silicic acid components. First of all, the active silicic acid or active aluminosilicic acid is a gel of amorphous silicic acid or aluminosilicic acid having a very large specific surface area, ordinarily a BET specific surface area of 50 to 300 m²/g, and is advantageous in that the reactivity is prominently high. Moreover, this active silicic acid or aluminosilicate acid is quite different from ordinary gel-like silica in that it has a fine microstructure suitable for the synthesis of a zinc silicate type mineral excellent in the particle characteristics. Generally, a clay mineral has a two-layer or three-layer base structure comprising a layer of a tetrahedron of $SiO_4$ and a layer of octahedron of $AlO_6$ or the like bonded in the form of a laminate, and these base structures are laminated to form a multi-layer structure. If a clay mineral having such a structure is treated with an acid, the $AlO_6$ octahedron layer is extracted as a soluble salt by the reaction with the acid and its crystal structure is substantially destroyed, but the $SiO_4$ tetrahedron layer retains a fine layer structure and constitutes a main portion of active silica.

As pointed out hereinbefore, zinc phyllosilicate of the sauconite type structure has a three-layer base structure comprising a layer of an octahedron of $ZnO_6$ sandwiched with two layers of a tetrahedron of $SiO_4$. This zinc phyllosilicate is in common with the acid-treated clay mineral in that the $SiO_4$ tetrahedron layer is bonded lamellarly to the $ZnO_6$ or $AlO_6$ octahedron layer, and also in common with the starting clay in that a layer of a tetrahedron of $SiO_4$ is present.

According to the present invention, by using the above-mentioned active silicic acid or active aluminosilicate acid as the starting material, a crystalline zinc silicate type mineral can be easily obtained, and it is considered that the reason is that because of the presence of laminar silica as the base component of active silicic acid or active aluminosilicate acid, rearrangement to the sauconite type zinc silicate mineral can be facilitated while retaining the skeleton shell of laminar silica. Furthermore, laminar silica is more easily decomposed to smaller units of silicic acid than a silica gel having a three-dimensional structure and hence, rearrangement to hemimorphite or willemite can be performed easily.

One of the prominent characteristic features of the present invention is that by using active silicic acid or active aluminosilicate acid obtained by the acid treatment of a clay mineral as the starting material, there can be obtained a zinc silicate type mineral which is excellent in the fineness and uniformity of the particle size and has a very good pigmenting property. when a zinc silicate mineral is synthesized from a coprecipitation gel of $SiO_2$-ZnO as the starting material according to the conventional process, the obtained mineral is defective in that the mineral is generally obtained in the state where particles are mutually agglomerated strongly to one another. In contrast, no agglomeration is substantially caused in mineral particles obtained according to the synthesis process of the present invention, and if particles are agglomerated, the degree of agglomeration is so low that agglomerated particles are easily disintegrated by pressing them between fingers. It is considered that the reason is that the above-mentioned laminar silica acts as a nucleus at the reaction and hence, a zinc silicate mineral having a fine and uniform particle size is obtained.

In the present invention, as the clay mineral, there are preferably used a clay mineral of the smectite group, for example a clay mineral of the montmorillonite group such as acid clay, bentonite, sub-bentonite or fuller's earth; beidellite; saponite; nontronite and a mixture of two or more of them. Moreover, other clay minerals, for example, a clay mineral of the kaolin group such as kaolin or halloysite and a chain structure clay mineral such as attapulgite, spiolite or palygorskite, can be used. For example, kaolin has no reactivity with an acid as it is, but if this is converted to metakaolin by calcination, it can be easily reacted with an acid.

It is preferred that the acid treatment of the mineral clay is carried out to such an extent that the X-ray diffraction peak of the plane index (001) of the clay mineral substantially disappears and the $Al_2O_3/SiO_2$ molar ratio of the product is within the range of from 1/11 to 1/99. The acid treatment may be carried out under known conditions. For example, as the acid, there may be used a mineral acid such as sulfuric acid, hydrochloric acid or nitric acid or an organic acid such as benzene-sulfonic acid, toluene-sulfonic acid or acetic acid. Ordinarily, a mineral acid such as sulfuric acid is used. The method of contact of the clay mineral with the acid is not particularly critical, and for example, there can be adopted a slurry activation method in which the clay is contacted with the acid in the slurry state, a granular activation method in which the granulated clay is subjected to solid-liquid contact with the acid, and a dry activation method in which a mixture of the clay and acid is reacted in the dry state (within particles) and a salt formed as a by-product is then extracted. The amount used of the acid is changed according to the acid treatment conditions, but the acid is ordinarily used in such an amount that the $Al_2O_3/SiO_2$ molar ratio in the product is within the above-mentioned range and $Fe_2O_3$, MgO and other basic components such as an alkali metal component are substantially removed. For example, in the case of the dry activation method, the acid treatment is carried out by using an acid or an aqueous solution of an acid in an amount of 0.3 to 1.5 equivalents, especially 0.6 to 1.2 equivalents, to the basic components in the mineral. The reaction conditions are selected within temperatures of 60° to 300° C. and reaction times of 10 to 600 minutes so that the above-mentioned requirements are satisfied. Extraction of the soluble basic component from the reaction product is carried out in an aqueous medium having a pH value smaller than 1 so as to prevent advance of the hydrolysis.

It is preferred that the particle size of the acid-treated product of the clay mineral be as fine as possible. More specifically, it is preferred that before the hydrothermal treatment, the particle size of the acid-treated product of the clay mineral be adjusted so that particles having a particle size smaller than $5\mu$ occupy at least 20% by weight, especially at least 30% by weight, of the total particles and particles having a particle size larger than $20\mu$ occupy less than 30% by weight, especially less than 10% by weight, of the total particles.

As the starting zinc component, there can be used an oxide (zinc flower) or hydroxide of zinc or a compound capable of forming said oxide or hydroxide under the reaction conditions. As a typical instance of this compound, zinc carbonate can be mentioned.

In the process of the present invention, it is preferred that active silicic acid or active aluminosilicate ($SiO_2$) and the starting zinc component (ZnO) be used in substantially stoichiometric amounts for the reaction. More specifically, in case of the sauconite type, the $ZnO/SiO_2$ molar ratio is preferably 3/4, and in the case of the hemimorphite or willemite type, the $ZnO/SiO_2$ molar ratio is preferably 2/1. Of course, the composition ratio of both the components is not limited to the above-mentioned molar ratio, and it is permissible that the $ZnO/SiO_2$ molar ratio may be changed within the range of from 1/4 to 10/4, especially from 1/4 to 6/4 in the case of the sauconite type or from 3/4 to 10/4 in the case of the hemimorphite or willemite type.

At the hydrothermal treatment, both the starting materials are formed into an aqueous slurry having a solid content of 2 to 30% by weight so that stirring of the reaction mixture is possible and the reaction can be performed homogeneously, and this aqueous slurry is charged in an autoclave and the hydrothermal reaction is carried out. The reaction conditions are changed according to the kind of the intended product. For example, a relatively low temperature of 130° to 170° C. is preferred for the sauconite type, a relatively high temperature of 150° to 250° C. is preferred for the hemimorphite type, and a temperature higher than 200° C. is preferred for the willemite type.

According to the process of the present invention, the hydrothermal treatment is carried out under a spontaneous pressure corresponding to the above-mentioned temperature, and in this case, the pressure in the reaction system is generally 2 to 50 kg/cm² gauge. One of the characteristic features of the present invention is that the hydrothermal treatment is carried out under such a low pressure as described above. The reaction time depends on the temperature and pressure, but it is generally preferred that the hydrothermal treatment be conducted for 1 to 10 hours.

The product is subjected to a post treatment such as water washing, drying, pulverization or classification according to need.

A zinc silicate of the willemite type can also be prepared by first preparing a zinc silicate mineral of the hemimorphite type and heating and dehydrating this zinc silicate at a temperature higher than 750° C.

The crystalline zinc silicate type synthetic mineral according to the present invention is characterized in that the particle size is fine and uniform and the pigmenting property is very excellent.

Moreover, the zinc silicate type synthetic mineral according to the present invention has peculiar characteristics owing to the crystal structure thereof, which are summarized in Table D given below.

TABLE D

| Characteristics | Crystal Structure | | |
| --- | --- | --- | --- |
| | Sauconite type | Hemimorphite type | Willemite type |
| Average particle size $(\mu)^1$ | 1–6 | 0.5–3 | 0.5–3 |
| BET specific surface area (m²/g) | 80–200 | 0–80 | 0–80 |
| Oil absorption (ml/100g)² | 80–160 | 60–120 | 60–120 |
| Bulk density (g/cc)³ | 0.2–0.5 | 0.2–0.5 | 0.2–0.5 |

TABLE D-continued

| Characteristics | Crystal Structure | | |
|---|---|---|---|
| | Sauconite type | Hemimorphite type | Willemite type |
| Hunter whiteness (%) | 85-95 | 88-98 | 88-98 |

Note
[1]median diameter determined according to the centrifugal sedimentation method
[2]determined according to the method of JIS K-5101
[3]determined according to the method of JIS K-6220

The sauconite type has a relatively large specific surface area and characteristics of a solid acid, and because of these characteristics, the sauconite type zinc silicate mineral is advantageously used as a color developer or color developing assistant for a leuco dye or pigment.

The zinc silicate mineral of the hemimorphite or willemite type is characterized in that the oil absorption is large though the surface activity is relatively low. Accordingly, the mineral of this type is effectively used in combination with an inorganic or organic color developer for a leuco pigment or dye in the field of heat-sensitive copying and recording papers.

Uses of the zinc silicate mineral according to the present invention are not limited to those mentioned above, but it may be widely used as a filler for resins and rubbers, an agricultural filler, a catalyst carrier and the like in various fields.

The present invention will now be described in detail with reference to the following examples that by no means limit the scope of the invention.

Incidentally, the X-ray diffractometry was carried out under the following conditions in the examples.

The apparatus used for the X-ray diffractometry was one supplied by Rigaku Denki K.K. (equipped with X-ray generating device Model 4036A1, goniometer Model 2125D1 and counter Model 5071). The diffraction conditions were as follows:
Target: Cu
Filter: Ni
Detector: SC
Voltage: 35 KVP
Current: 15 mA
Count full scale: 8000 c/s
Time constant: 1 second
Scanning speed: 2°/min
Chart speed: 2 cm/min
Emission angle: 1°
Slit width: 0.3 mm
Glancing angle: 6°

EXAMPLE 1

Acid clay produced at Nakajo-machi, Niigata prefecture, Japan was roughly pulverized and molded in a linear form having a diameter of 3 mm, and 200 g of the so-molded clay was mixed with sulfuric acid in an amount corresponding to 3.5 times the total gram equivalents, (1.14 gram equivalents/100 g of the dry clay) of basic metal components contained in the clay, such as aluminum, magnesium, calcium, iron, sodium, potassium and titanium, that is, 700 ml of 34% sulfuric acid. The mixture was heated on a water bath maintained at 85° C. for 15 hours to effect a heat treatment. Water washing was carried out by filtration to obtain a cake. A small amount of the cake was dried at 110° C., pulverized and subjected to the quantitative analysis. It was found that the $SiO_2$ content was 92.7% (based on the product dried at 110° C.). The obtained cake was charged in a pot mill and water was added, and wet pulverization was carried out by using flint balls to obtain a slurry having an $SiO_2$ content of 15% (the first step was completed).

Then, 200 g of the obtained slurry (30 g of $SiO_2$) and 30 g of zinc oxide (first class reagent) were charged in an autoclave having an inner capacity of 1 liter, and 370 g of water was further added and hydrothermal synthesis reaction was carried out at 160° C. under agitation at 500 rpm for 5 hours. After cooling, the reaction product was taken out and water was separated by filtration, and the residue was dried at 130° C. The dried product was pulverized by a small desk sample mill to obtain a white fine powder (the second step was completed).

From the results of the X-ray diffractometry, it was found that the product was zinc silicate of the sauconite type.

EXAMPLE 2

An autoclave having a capacity of 1 liter was charged with 200 g of the slurry obtained at the first step of Example 1 (30 g of $SiO_2$) and 43 g of zinc carbonate (first class reagent having a Zn content of 57%), and 370 g of water was added and hydrothermal synthesis reaction was carried out at 170° C. under agitation at 500 rpm for 5 hours. After cooling, the reaction product was taken out and water was separated by filtration, and the residue was dried at 130° C. The dried product was pulverized by a small desk sample mill to obtain a white fine powder.

From the results of the X-ray diffractometry, it was found that the product was zinc silicate of the sauconite type.

EXAMPLE 3

Acid clay (having a water content of 32.4%) produced at Odo, Shibata city, Niigata prefecture, Japan was roughly pulverized, and 3 kg of 25% sulfuric acid was added to 740 g of the roughly pulverized clay. The mixture was heated at 95° C. for 10 hours and the liquid was removed by filtration, and 3 kg of 25% sulfuric acid was added to the residue again and the mixture was heated at 95° C. for 10 hours to complete a heat treatment. Water washing was carried out by filtration to obtain a cake. A small amount of the cake was dried at 110° C. and subjected to the determinative analysis. It was found that the $SiO_2$ content was 91.5% (based on the product dried at 110° C.). The obtained cake was charged in a pot mill and water was added, and the mixture was wet-pulverized by using flint balls to obtain a slurry having an $SiO_2$ content of 15% (the first step was completed).

Then, 200 g of the so-obtained slurry (30 g of $SiO_2$) and 62 g of zinc oxide (first class reagent) were charged in an autoclave having a capacity of 1 liter, and 370 g of water was added and hydrothermal synthesis reaction was carried out at 170° C. under agitation at 500 rpm for 5 hours. After cooling, the reaction product was taken out and water was separated by filtration, and the residue was dried at 130° C. and pulverized by a small desk sample mill to obtain a white fine powder (the second step was completed).

From the results of the X-ray diffractometry, it was found that the product was zinc silicate of the hemimorphite type.

EXAMPLE 4

An autoclave having a capacity of 1 liter was charged with 200 g of the slurry obtained at the first step of Example 3 (30 g of SiO$_2$) and 62 g of zinc oxide (first class reagent), and 370 g of water was added and hydrothermal synthesis reaction was carried out at 250° C. under agitation at 500 rpm for 5 hours. After cooling, the reaction product was taken out and water was separated by filtration, and the residue was dried at 130° C. The dried product was pulverized by a small desk sample mill to obtain a white fine powder.

From the results of the X-ray diffractometry, it was found that the product was zinc silicate of the willemite type.

EXAMPLE 5

The powder of zinc silicate of the hemimorphite type obtained in Example 3 was charged in a porcelain crucible and calcined in an electric furnace maintained at 800° C. to obtain a white fine powder.

From the results of the X-ray diffractometry, it was found that the product was zinc silicate of the willemite type.

We claim:

1. A process for the preparation of a zinc silicate of the sauconite structure represented by the following formula:

$$Zn_3Si_4O_{10}(OH)_2,$$

which comprises (1) subjecting a clay mineral of the smectite group to an acid treatment to such an extent that the X-ray diffraction peak of the plane index (001) of the clay mineral substantially disappears and the Al$_2$O$_3$/SiO$_2$ molar ratio of the acid-treated product is within the range of from 1/11 to 1/99, and (2) subjecting the acid-treated product of the clay mineral and an oxide or hydroxide of zinc or a compound capable of forming said oxide or hydroxide under reaction conditions, to a hydrothermal treatment at a ZnO/SiO$_2$ molar ratio of about 3/4 at a temperature of 130° to 170° C. and a spontaneous pressure corresponding to the temperature.

2. A process according to claim 1, wherein the acid treatment of the clay mineral is carried out at 60° to 300° C. for 10 to 600 minutes.

3. A process according to claim 1, wherein before the hydrothermal treatment, the particle size of the acid-treated product of the clay mineral is adjusted so that particles having a particle size smaller than 5μ occupy at least 20% by weight of the total particles and particles having a particle size larger than 20μ occupy less than 30% by weight of the total particles.

4. A process according to claim 1, wherein the hydrothermal treatment is carried out under a pressure of 2 to 50 kg/cm$^2$ gauge.

5. A process according to claim 1, wherein the hydrothermal treatment is conducted for 1 to 10 hours.

6. A process for the preparation of a zinc silicate of the hemimorphite structure represented by the following formula:

$$Zn_4Si_2O_7(OH)_2$$

which comprises (1) subjecting a clay mineral of the smectite group to an acid treatment to such an extent that the X-ray diffraction peak of the plane index (001) of the clay mineral substantially disappears and the Al$_2$O$_3$/SiO$_2$ molar ratio of the acid treated product is within the range of from 1/11 to 1/99, and (2) subjecting the acid-treated product of the clay mineral and an oxide or hydroxide of zinc or a compound capable of forming said oxide or hydroxide under reaction conditions, to a hydrothermal treatment at a ZnO/SiO$_2$ molar ratio of about 2/1 at a temperature of 150° to 250° C. and a spontaneous pressure corresponding to the temperature.

7. A process according to claim 6 wherein the acid treatment of the clay mineral is carried out at 60° to 300° C. for 10 to 600 minutes.

8. A process according to claim 6 wherein before the hydrothermal treatment, the particle size of the acid-treated product of the clay mineral is adjusted so that particles having a particle size smaller than 5μ occupy at least 20% by weight of the total particles and particles having a particle size larger than 20μ occupy less than 30% by weight of the total particles.

9. A process according to claim 6 wherein the hydrothermal treatment is carried out under a pressure of 2 to 50 kg/cm$^2$ gauge for 1 to 10 hours.

10. A process for the preparation of a zinc silicate of the willemite structure represented by the following formula:

$$Zn_2SiO_4$$

which comprises (1) subjecting a clay mineral of the smectite group to an acid treatment to such an extent that the X-ray diffraction peak of the plane (001) of the clay mineral substantially disappears and the Al$_2$O$_3$/SiO$_2$ molar ratio of the acid-treated product is within the range of from 1/11 to 1/99, and (2) subjecting the acid-treated product of the clay mineral and an oxide or hydroxide of zinc or a compound capable of forming said oxide or hydroxide under reaction conditions to a hydrothermal treatment at a ZnO/SiO$_2$ molar ratio of about 2/1 at a temperature greater than 200° C. and a spontaneous pressure corresponding to the temperature.

11. A process according to claim 10 wherein the acid treatment of the clay mineral is carried out at 60° to 300° C. for 10 to 600 minutes.

12. A process according to claim 10 wherein before the hydrothermal treatment, the particle size of the acid-treated product of the clay mineral is adjusted so that particles having a particle size smaller than 5μ occupy at least 20% by weight of the total particles and particles having a particle size larger than 20μ occupy less than 30% by weight of the total particles.

13. A process according to claim 10 wherein the hydrothermal treatment is carried out under a pressure of 2 to 50 kg/cm$^2$ gauge for 1 to 10 hours.

* * * * *